United States Patent [19]

Weir et al.

[11] 4,167,822

[45] Sep. 18, 1979

[54] DRIVING TOY PROJECTOR

[75] Inventors: George R. Weir, Solvang, Calif.; Howard J. Morrison, Deerfield, Ill.

[73] Assignee: Marvin Glass & Associates, Chicago, Ill.

[21] Appl. No.: 871,599

[22] Filed: Jan. 23, 1978

[51] Int. Cl.² .............................................. G09B 9/04
[52] U.S. Cl. .................................. 35/11 R; 273/1 R; 46/1 B
[58] Field of Search .......................... 35/11 R; 46/1 B; 273/1 I, 1 IM, 1 R; 353/47, 65, 67, 71, 74

[56] References Cited

U.S. PATENT DOCUMENTS

| | | | |
|---|---|---|---|
| 3,120,716 | 2/1964 | Orenstein | 46/1 B |
| 3,171,215 | 3/1965 | Glass et al. | 35/11 R |
| 3,583,079 | 6/1971 | Koci | 35/11 R |
| 3,659,375 | 5/1972 | Stubbmann | 46/1 B |
| 3,707,781 | 1/1973 | Brown | 35/11 R |
| 3,739,069 | 6/1973 | Sandmeier | 353/71 X |
| 3,767,196 | 10/1973 | Nakamura | 35/11 R X |
| 3,819,178 | 6/1974 | Ochi | 35/11 R X |

FOREIGN PATENT DOCUMENTS 1063505 8/1959 Fed. Rep. of Germany .......... 35/11 R

*Primary Examiner*—William H. Grieb
*Attorney, Agent, or Firm*—Mason, Kolehmainen, Rathburn & Wyss

[57] ABSTRACT

Apparatus for projecting moving images of a travel path environment onto a remote surface simulating the operation of an automobile, airplane or other conveyance comprises a projector housing having a control end and an opposite end with an opening therein for passing a light beam generally longitudinally of the housing toward the remote surface. A beam forming light source is mounted for manually controlled lateral movement adjacent the control end of the housing and forms a light beam projecting outwardly through and shaped by said opening onto the remote surface. An endless belt having a run moving longitudinally of the light beam toward the light source is provided in the housing with one or more image forming devices mounted on the belt to form moving images with the light beam. Control means in the form of a steering wheel is provided for manually controlling the lateral position of the light source in the housing and thereby simulate lateral movement of a motor vehicle or other conveyance during its operation. The endless belt is provided with a plurality of spaced apart openings thereon and the image forming devices in the form of transparencies or models of motor vehicles or other conveyances can be removably mounted in selected ones of the openings as desired to provide a variety in the environment projected by the beam to test the driving skill of a driver during operation of the driving toy projector.

16 Claims, 4 Drawing Figures

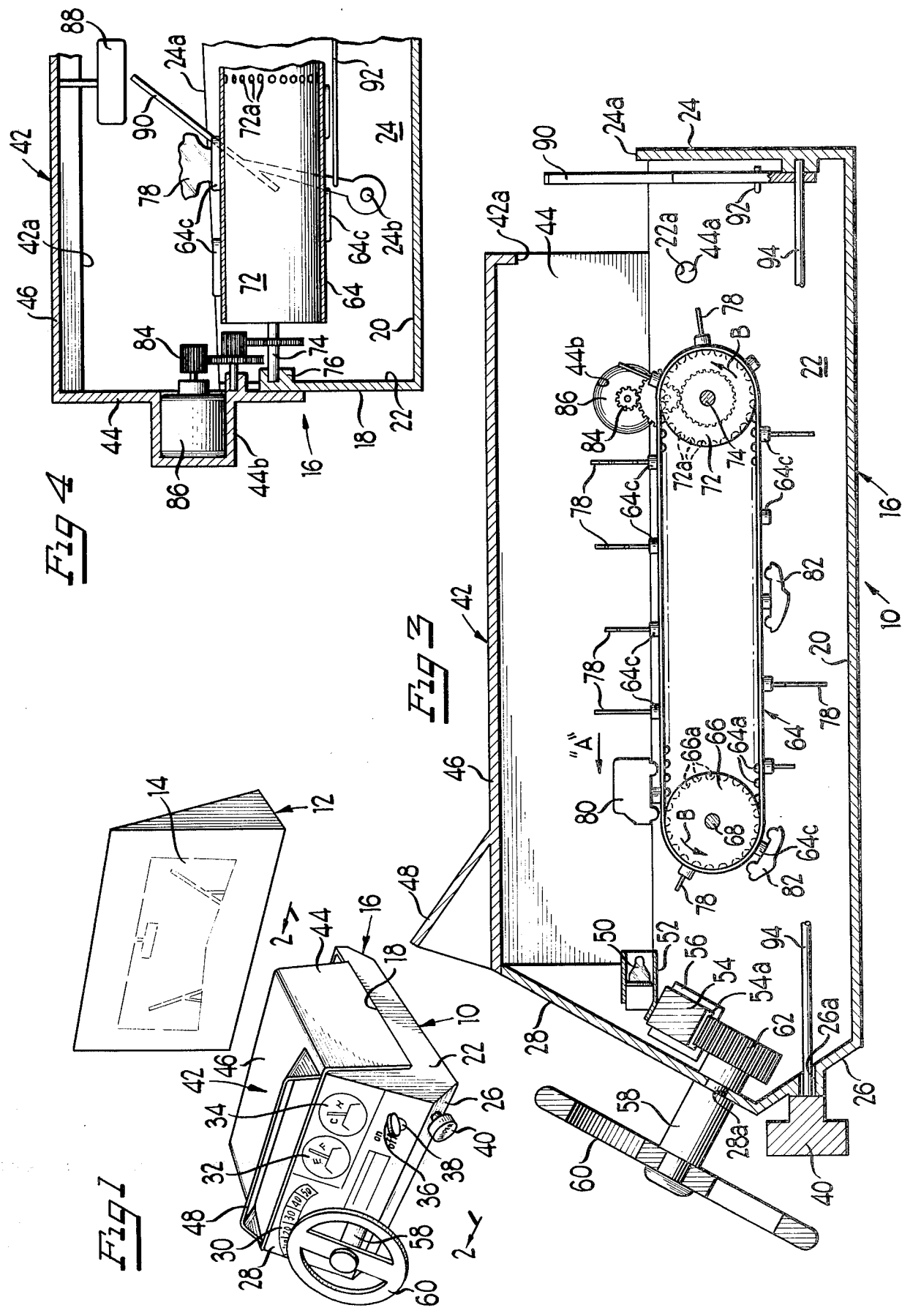

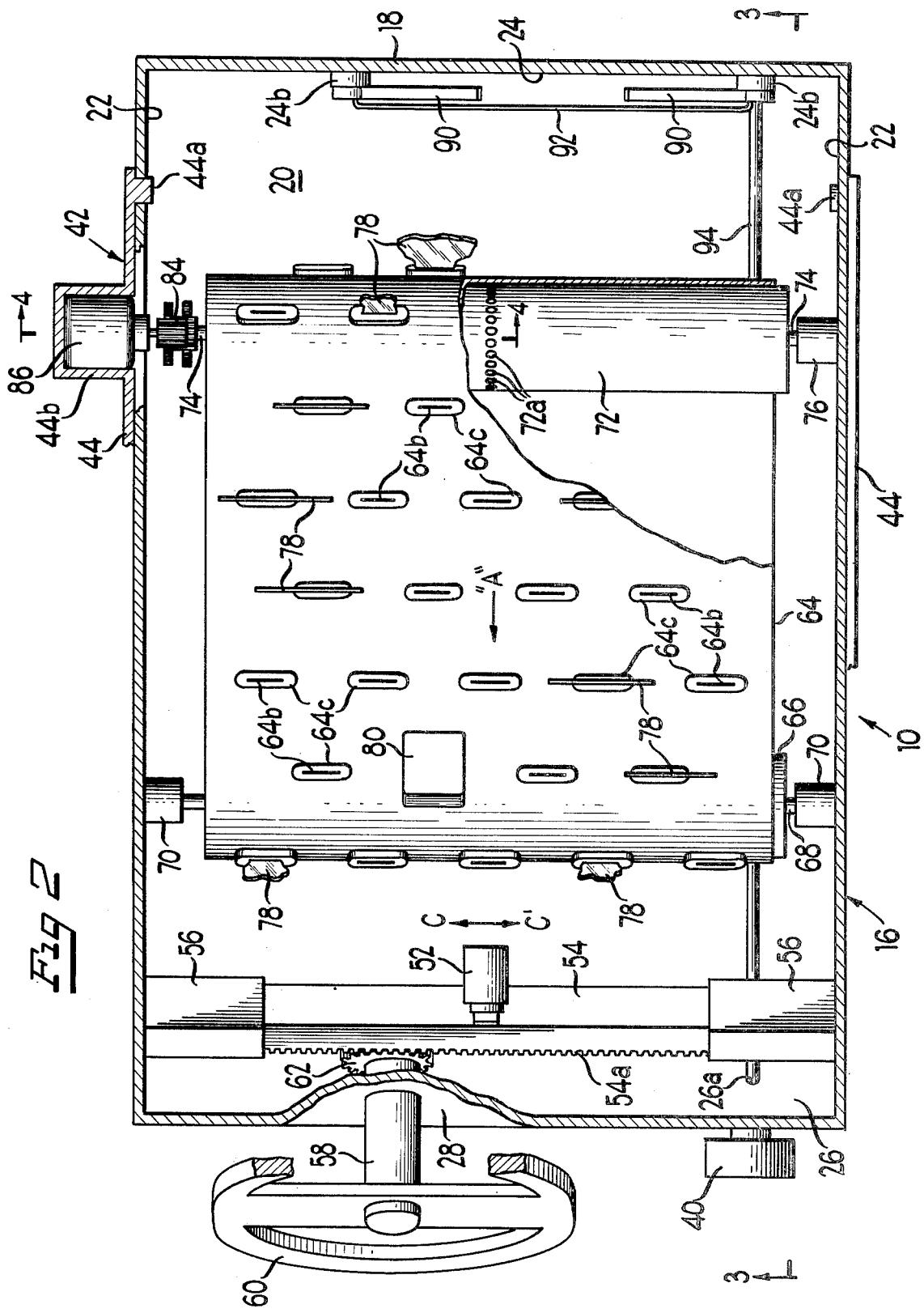

DRIVING TOY PROJECTOR

BACKGROUND OF THE INVENTION

1. Field of the Invention

The present invention relates to a driving toy projector or driving simulator apparatus and more particularly relates to a game type driving toy which projects moving images of a travel path environment onto a remote surface such as a screen to simulate driving a vehicle.

2. Description of the Prior Art

A wide variety of automobile and airplane driving simulators have been developed and a wide variety of toys and games utilizing apparatus of this character have been provided. These devices often provide long hours of amusement and entertainment for children and adults alike and are helpful in developing driver skills as well as manual dexterity and thought processes.

SUMMARY OF THE INVENTION

It is an object of the present invention to provide a new and improved driving toy projector or simulator apparatus for projecting moving images of a travel path environment onto a remote screen.

Yet another object of the present invention is to provide a new and improved driving toy amusement device which closely simulates the operation of an automobile or other conveyance.

Yet another object of the present invention is to provide a new and improved game device or toy of the character described which is useful in developing driving skills and manual dexterity.

Still another object of the present invention is to provide a new and improved game apparatus of the character described which may be reprogrammed to provide variety and interest during play.

Still another object and advantage of the present invention is to provide a new and improved simulation device of the character described which accurately reflects the view as seen by the operator of a vehicle through the windshield thereof during operation.

Still another object of the present invention is to provide a new and improved driving toy projector which provides accurate simulation of the operation of an automobile, airplane or other conveyance.

Yet another object of the present invention is to provide a new and improved amusement game device of the character described which is relatively small and compact in size, and which is straight forward and simple in construction and operation so that mass production is possible at economical costs.

Yet another object of the present invention is to provide a new and improved driving toy simulator which is useful in testing driving skills and also which provides an entertaining and exciting game.

The foregoing and other objects and advantages of the present invention are accomplished in a preferred embodiment which comprises a new and improved driving toy game apparatus for projecting moving images of a travel path environment onto a remote surface such as a screen or wall. The apparatus includes a projector housing having a control end resembling the dashboard or control panel of a vehicle and an opposite end having a light opening for passing and shaping a light beam extending generally longitudinally of the housing toward a remote viewing surface. A beam forming light source is mounted for manually controlled lateral movement adjacent the control end of the housing and directs a light beam through the opening onto the remote surface. An endless belt having a run moving longitudinally of the light beam toward the light source is provided with one or more removable, image forming devices detachably mounted on the belt. These devices interrupt the beam and form moving images of a travel path environment on the viewing surface. Control means such as a steering wheel is provided for manually controlling the lateral position of the light source to simulate steering action for avoidance of the various image forming devices such as trees, shrubs and other vehicles on the endless belt. The endless belt is provided with a plurality of slits or openings in which selected ones of the image forming devices in the form of transparencies or models of vehicles may be selectively positioned. The housing includes an openable cover which permits access to the run of the belt for easy reprogramming or repositioning of the various image producing devices on the belt to provide a variety of different travel path environments.

BRIEF DESCRIPTION OF THE DRAWINGS

For a better understanding of the invention, reference should be had to the following detailed description taken in conjunction with the drawings, in which:

FIG. 1 is a front perspective view of a new and improved driving toy projector apparatus for projecting moving images of a travel path environment on a screen and constructed in accordance with the features of the present invention;

FIG. 2 is a horizontal, sectional view of the projector apparatus taken substantially along lines 2—2 of FIG. 1;

FIG. 3 is a longitudinal, vertical, sectional view taken substantially along lines 3—3 of FIG. 2; and FIG. 4 is a fragmentary transverse, vertical sectional view taken substantially along lines 4—4 of FIG. 2.

DESCRIPTION OF THE PREFERRED EMBODIMENT

Referring now more particularly to the drawings, therein is illustrated a new and improved driving toy projector apparatus for projecting moving images of a travel path environment onto a remote surface such as a screen. The apparatus includes an image projector 10 and may also include a remote screen 12 as illustrated in FIG. 1, however, in the absence of a screen, the images may be formed on a wall surface or other surfaces which are light in color and substantially flat, such as cardboard or the like. The projecting apparatus 10 is adapted to form an image 14 on the surface of the screen which resembles the view as seen by a driver through the windshield of a vehicle or conveyance. The images are fashioned within the projector and are projected outwardly on a shaped or profiled light beam against the surface of the screen.

The projector includes a housing or enclosure 16 having a generally rectangular base portion 18 preferably formed of molded plastic material and including a bottom wall 20, a pair of opposite, vertical sidewalls 22 and a rear end wall 24. At the forward or control end, the housing is formed with a relatively narrow, lower portion 26 sloping upwardly and forwardly of the bottom wall 20, and a relatively wide upper panel portion 28 sloping upwardly and rearwardly of the line of interconnection with the lower panel portion 26. The forward end panels 26 and 28 are decorated to resemble the dashboard or control panel of an automobile or other vehicle and for this purpose include indicia thereon representing a speedometer 30, a fuel gauge 32, a temperature gauge 34, an on/off ignition switch 36 operated by a key 38 and a windshield wiper control knob 40 is mounted on the lower panel section 26.

The projector housing also includes an upper cover member 42 having an opening 42a at the rearward end to shape and pass the light beam. The cover includes a pair of opposite vertical sidewalls 44 integrally formed along opposite edges of a top wall 46 and is pivotally attached to the lower housing or base 18 by means of a pair of inwardly extending integral pivot pins 44a at the lower rear corners of the sidewalls which are seated in apertures 22a formed in the housing sidewalls 22 of the lower base 18. The upper housing or cover member 42 is pivotable from a closed position as shown in FIG. 3 to an open position extending upwardly of the lower base 18 and when opened, provides excellent access to the interior of the projector housing. A wind screen 48 is mounted along the forward end of the top wall 46 of the cover 42 to simulate closely the appearance of a vehicle.

In accordance with the present invention, the projector 10 includes a light beam forming light source in the form of a magnifying light bulb 50 (FIG. 3) mounted in a housing 52 which is carried by a transverse rack 54 having teeth 54a along a downwardly sloping surface. The magnifying light bulb directs a beam of light rearwardly in the housing in a generally longitudinal direction and the light beam passes out the shaped rear opening 42a of the cover to form the moving image 14 on the screen 12 or other flat surface.

The light source is manually controlled to move laterally with respect to the longitudinal axis of the projector housing 16 and moves with the rack 54 which is supported at opposite ends by a pair of hollow tubular elements 56 integrally formed to project inwardly from the opposite sidewalls 22 of the housing base 18. Lateral movement of the rack 54 and the light source 50 is controlled by means of a steering wheel 60 mounted at the outer end of a steering shaft 58 which projects through the upper control panel 28 and is journaled in a circular opening 28a as shown in FIG. 3. An inner end portion of the shaft is provided with a drive gear 62 which engages the teeth 54a to drive the rack 54 back and forth. Manual rotation of the steering wheel 60 in either direction causes the rack to reciprocate back and forth (arrows "C") from a longitudinal center of the housing and the light source 50 thus moves to the right or left dependent on the direction of rotation of the steering wheel.

In accordance with the present invention, the projector 10 is provided with an endless belt 64 formed of thin, flexible, resilient material and the belt is entrained around a forward roll 66 carried on a laterally extending axle 68 supported at opposite ends by a pair of integrally formed tubular bosses 70 projecting inwardly from the opposite sidewall 22 of the lower base 18. A rearward roll 72 similar to the roll 66, is provided adjacent a rearward end portion of the housing and this roll is mounted on a drive axle 74 extending transversely across the housing and supported in a pair of integrally formed tubular bosses 76 projecting inwardly from the sidewalls 22 of the housing base. At a mid point on each belt roll, there is provided a row or ring of circular indentations or recesses 66a and 72a respectively for driving engagement with a row of spherical cleats or teeth 64a formed on the inside surface of the endless belt along the longitudinal center line thereof. The driving engagement between the cleats or teeth of the endless belt and the row of recesses on the belt rolls prevents slippage between the belt and rolls. The endless belt is positioned in the housing to provide a generally horizontal upper run which extends longitudinally therein. Along the upper run, the belt moves toward the light source 50 as indicated by the arrow "A" (FIG. 3) as the rolls 66 and 72 rotate in a counterclockwise direction as indicated by the arrows "B."

In accordance with the invention, the endless belt 64 is formed with a plurality of transversely extending slits or elongated openings 64b arranged in spaced apart, end to end relation in spaced apart, parallel rows as best shown in FIG. 2. Each opening or slit is formed along a center line of an upstanding, integrally formed rib or projection 64c which forms flexible, supportive sidewalls for holding one of a plurality of upstanding image forming elements or devices which may be of a variety of different forms, such as transparencies 78 which are shaped to resemble trees, bushes and other items commonly forming the environment of a travel path. Additional image forming devices include vehicle models such as a truck 80 and automobiles 82 which may be formed of opaque materials and used to represent oncoming vehicular traffic.

The image forming elements 78, 80 and 82 thus continuously change the shape and define the light beam which projects rearwardly from the light source 50 so that the image 14 formed on the screen reflects a simulation of the movement of a vehicle along a path or environment commonly encountered by the operator of a vehicle. Each of the image forming devices is formed with a downwardly extending foot or tab portion which extends into a selected opening or slit 64b on the endless belt 64 and the tab is held in place by the pressure of the resilient sidewalls of the ribs 64c which is sufficient to support an element hanging upside down as on the bottom run of the belt. It will be seen in FIG. 2, that the slit-like openings 64b in adjacent rows on the belt are staggered and that the image forming elements may be easily repositioned on the belt as desired to change the travel path environment or the roadway that will be depicted by the image 14 formed on the screen. The novel structure of the endless belt and the image forming devices thus provide a programming capability for the projector so that the path of travel or environment depicted by the moving images may be changed from time to time to add excitement and better test the skill of an operator in avoiding the obstructions encountered along the travel path.

The rear belt roll 72 and its supporting drive shaft 74 are driven by means of a reduction gear train 84 which is powered by a small electric motor 86 mounted in an integrally formed, pocket-like enclosure 44b formed in the left hand sidewall of the cover 42. When the cover is placed in the down or normal position as shown in FIG. 3, a pinion on the shaft of the motor 86 is moved into driving engagement with the gear train 84 and the gear train provides the necessary speed reduction for driving the roll 72 at a desired lower speed.

In accordance with the present invention, the inside surface of the sidewalls 44 of the cover 42 and the lower edge of the rearward wall flange 42a serve to shape the outer outline of the image 14 on the screen to resemble the views as seen from a driver's seat through the windshield of a vehicle. In addition, the upper edge 24a of the rear end wall 24 of the lower housing base 18 is tapered upwardly towards the center to better represent a hood-like structure in the image. In addition, a depending, rear view mirror 88 is provided at the center of the light opening in the rear of the cover to add realism to the image that is formed.

In accordance with the invention, the projector 10 also includes a pair of windshield wipers 90 pivotally supported from bosses 24b on the rear end wall 24 of the housing base 18. These windshield wipers extend upwardly above the upper edge 24a of the end wall and are movable back and forth across the light shaping opening to provide moving images of windshield wipers in the image on the screen. The wipers are connected to move in unison by a connecting link 92 and are driven by means of an elongated shaft 94 which projects from the righthand boss 24b towards an opening 26a in the lower front panel 26. The wiper control knob 40 is mounted on an outer end portion of the shaft 94 so that an operator may manually control the windshield wipers as desired and thereby more closely resemble or simulate the image of a vehicle underway.

From the foregoing it will be seen that the driving toy projector provides a versatile toy for simulating the operation of a motor vehicle or other conveyance. A moving image is projected and the environment portrayed may be readily reprogrammed or changed as desired to provide more interest and excitement and to better develop the skill of the players.

Although the present invention has been described with reference to a single illustrated embodiment thereof, it should be understood that numerous other modifications and embodiments can be devised by those skilled in the art that will fall within the spirit and scope of the principles of this invention.

What is claimed as new and desired to be secured by Letters Patent of the United States is:

1. Apparatus for projecting moving images of a travel path onto a remote surface, comprising:
   a housing having a control end and an opposite end with an opening therein for shaping a light beam generally longitudinally of said housing toward said remote surface;
   a beam forming light source mounted for lateral movement adjacent said control end in said housing for directing a light beam through said opening onto said remote surface;
   an endless belt having a run moving longitudinally of said light beam toward said light source;
   a plurality of image forming devices;
   means for removably mounting said image forming devices at various positions on said endless belt to move toward said light source therewith and to thereby form moving images on said remote surface which appear to approach the user; and
   control means for manually controlling the lateral position of said light source in said housing to cause the images formed on the remote surface to move in an opposite direction and thereby produce a realistic illusory effect of driving.

2. The apparatus of claim 1 wherein said opening in said opposite end of said housing has a profile shaped to form said beam with an outline of a view as seen from inside a moving vehicle.

3. The apparatus of claim 2 wherein said profile includes a rear view mirror.

4. The apparatus of claim 2 wherein said profile includes the hood of a land vehicle.

5. The apparatus of claim 1 including an element mounted for movement laterally across said opening forming an image resembling a windshield wiper.

6. The apparatus of claim 5 wherein said element is pivotally mounted below said opening in said opposite end of said housing and projects upwardly to move back and forth across said opening.

7. The apparatus of claim 6 including motor means for pivoting said element back and forth.

8. The apparatus of claim 7 wherein said motor means includes shaft means supporting said element and extending longitudinally through said control end for manual rotation.

9. The apparatus of claim 1 wherein said control means includes a shaft journaled to extend outwardly of said control end of said housing and a steering wheel mounted on said shaft exteriorly of said housing.

10. The apparatus of claim 9 including rack means supporting said light source mounted for reciprocal longitudinal movement laterally of said housing adjacent said control end, said control means including a pinion on said shaft engaging said rack to move the latter upon rotation of said wheel.

11. The apparatus of claim 1 wherein said means for removably mounting said image forming devices on said endless belt includes a plurality of spaced apart openings therein spaced longitudinally and laterally, said image forming devices including feet portions adapted to be removably inserted in selected openings of said belt for supporting said devices in outwardly extended position on said run moving toward said light source.

12. The apparatus of claim 11 wherein at least one image forming device comprises a transparency.

13. The apparatus of claim 11 wherein at least one image forming device comprises a model resembling a motor vehicle.

14. The apparatus of claim 11 wherein said endless belt is formed of thin flexible, resilient sheet material and said openings comprise elongated slits extending transversely thereof and spaced apart laterally in longitudinally spaced apart rows.

15. The apparatus of claim 14 wherein said belt is formed with an upstanding annular ridge around each of said slits for supporting said image forming devices at right angles to an outer surface of said belt.

16. The apparatus of claim 11 wherein said housing includes a movable cover openable to expose said run of said belt for placement of said image forming devices in selected openings therein.

* * * * *